United States Patent
Zhang et al.

(10) Patent No.: US 12,407,480 B2
(45) Date of Patent: Sep. 2, 2025

(54) METHOD FOR REPORT CONFIGURATION

(71) Applicant: ZTE Corporation, Guangdong (CN)

(72) Inventors: Nan Zhang, Guangdong (CN); Wei Cao, Guangdong (CN); Jianqiang Dai, Guangdong (CN); Zhen Yang, Guangdong (CN)

(73) Assignee: ZTE Corporation, Guangdong (CN)

( * ) Notice: Subject to any disclaimer, the term of this patent is extended or adjusted under 35 U.S.C. 154(b) by 331 days.

(21) Appl. No.: 17/853,280

(22) Filed: Jun. 29, 2022

(65) Prior Publication Data

US 2022/0337379 A1    Oct. 20, 2022

Related U.S. Application Data (63) Continuation of application No. PCT/CN2020/090630, filed on May 15, 2020.

(51) Int. Cl.
*H04L 5/00* (2006.01)
*H04L 5/04* (2006.01)

(52) U.S. Cl.
CPC .......... *H04L 5/0057* (2013.01); *H04L 5/0048* (2013.01); *H04L 5/0051* (2013.01); *H04L 5/04* (2013.01)

(58) Field of Classification Search
CPC ... H04L 5/0057; H04L 5/0048; H04L 5/0051; H04L 5/04
See application file for complete search history.

(56) References Cited

U.S. PATENT DOCUMENTS

| | | | | |
|---|---|---|---|---|
| 10,305,561 | B2* | 5/2019 | Baek | H04W 24/08 |
| 2012/0002740 | A1 | 1/2012 | Han et al. | |
| 2013/0301434 | A1 | 11/2013 | Krishnamurthy et al. | |
| 2014/0369291 | A1* | 12/2014 | Zhang | H04B 7/024 |
| | | | | 370/329 |
| 2019/0098523 | A1 | 3/2019 | Muruganathan et al. | |
| 2020/0015228 | A1 | 1/2020 | Kang et al. | |
| 2020/0099432 | A1 | 3/2020 | Määttanen et al. | |
| 2020/0236573 | A1 | 7/2020 | Zhang et al. | |
| 2021/0344397 | A1* | 11/2021 | Lee | H04B 7/02 |

(Continued)

FOREIGN PATENT DOCUMENTS

| | | |
|---|---|---|
| CN | 200610165694.X | 6/2008 |
| CN | 200710102004.0 | 10/2008 |
| CN | 102362473 A | 2/2012 |

(Continued)

OTHER PUBLICATIONS

International Search Report and Written Opinion received for Application No. PCT/CN2020/090630 mailed Feb. 18, 2021 (8 pages).

(Continued)

*Primary Examiner* — Huy D Vu
*Assistant Examiner* — Robert Ma
(74) *Attorney, Agent, or Firm* — Crowell & Moring LLP (57) ABSTRACT

The present disclosure relates to a wireless communication method for use in a wireless terminal. The wireless communication method comprises receiving, from a wireless network node, a configuration indicating resources of at least one reference signal, and transmitting, to the wireless network node, at least one report based on the configuration.

16 Claims, 4 Drawing Sheets

(56) References Cited

U.S. PATENT DOCUMENTS

2022/0166656 A1* 5/2022 Cha .................. H04W 64/00
2022/0278776 A1* 9/2022 Ling .................. H04L 1/1861

FOREIGN PATENT DOCUMENTS

| CN | 103053196 A | 4/2013 |
| CN | 108833061 A | 11/2018 |
| CN | 108933648 A | 12/2018 |
| CN | 110249571 A | 9/2019 |
| IN | 201927042186 A | 12/2019 |
| WO | WO 2018/031807 A1 | 2/2018 |
| WO | WO 2019/056981 A1 | 3/2019 |
| WO | WO 2021/098058 A1 | 5/2021 |

OTHER PUBLICATIONS

Office Action issued for China Patent Application No. 2020801004713 dated Jun. 28, 2024, with English translation (18 pp.).
Extended European Search Report received for Application No. EP 20896124.3 dated Nov. 29, 2022 (9 pages).
Li, Yitao et al., Forecast Based Handover in an Extensible Multi-Layer LEO Mobile Satellite System, IEEE Access, IEEE, USA, vol. 8, published Mar. 2, 2020 (16 pp.).

* cited by examiner

| ID | Frequency part ID | Polarization mode ID |
|---|---|---|
| L0 | F1 | P1 |
| L1 | F2 | P2 |
| L2 | F3 | P1 |
| L3 | F4 | P2 |

FIG. 4

| Beam ID | Frequency part ID |
|---|---|
| B0, B3, B6, B9 | F1 |
| B1, B4, B7, B10 | F2 |
| B2, B5, B8, B11 | F3 |

METHOD FOR REPORT CONFIGURATION

PRIORITY

This application claims priority as a Continuation of PCT/CN2020/090630, filed on May 15, 2020, entitled "METHOD FOR REPORT CONFIGURATION", published as WO 2021/109468 A1, the entirety of which is incorporated herein by reference.

TECHNICAL FIELD

This document is directed generally to wireless communications.

BACKGROUND

With the developments of wireless communication, the utilization of wideband frequency resources and spatial domain resources is further enhanced. In order to achieve wireless communication with high efficiency, more flexible measurement/report is needed to enable a gNB (next generation node B) with "intelligent" scheduling. However, for supporting such flexible measurement, more signaling and measurement efforts are needed at the user equipment (UE)-side according to existing mechanisms (e.g., gNB triggered measurement). Furthermore, for supporting the adaptation among different frequency resources (e.g. different bandwidth parts (BWPs)), measurements across a large scale of resources are needed and the impact caused by radio frequency (RF) tuning may need to be considered during the resource configuration for such measurements.

SUMMARY

This document relates to methods, systems, and devices for synchronization.

The present disclosure relates to a wireless communication method for use in a wireless terminal. The wireless communication method comprises:
  receiving, from a wireless network node, a configuration indicating resources of at least one reference signal, and
  transmitting, to the wireless network node, at least one report based on the configuration.

Various embodiments may implement the following features:

In some embodiments, the configuration indicates a resource reuse mode per reference signal, per resource group of reference signals or per resource groups of reference signals.

In some embodiments, the resource reuse mode indicates at least one of:
  a frequency region,
  a polarization mode,
  a combination of a frequency region and a polarization mode, or
  a spatial resource.

In some embodiments, the configuration indicates an identification, ID, associated to the resource reuse mode.

In some embodiments, the ID is associated to one of the indexes for the resource reuse mode based on one of:
  the ID,
  the maximum number of the indexes for the resource reuse mode and the ID, or
  the maximum number of the supported resource reuse modes and the ID.

In some embodiments, the ID is associated to one of the indexes for the resource reuse mode based on:

$$\mathrm{mod}(l,N+1)+1$$

wherein mod(X,Y) is a function of modulo operation of dividing X by Y,
  and l is the ID and N refers to the maximum number of indexes for resource reuse mode.

In some embodiments, the ID is associated to one of the indexes for the resource reuse mode based on:

$$\mathrm{mod}(l,M)+1$$

wherein mod(X,Y) is a function of modulo operation of dividing X by Y,
  and l is the ID and M refers to the maximum number of supported resource reuse modes.

In some embodiments, the ID is associated to one of the indexes for the resource reuse mode based on:

$$\left\lfloor \frac{l}{N+1} \right\rfloor$$

wherein $\lfloor X \rfloor$ is a function of acquiring the maximum integer smaller than or equal to X,
  and l is the ID and N refers to the maximum number of indexes for the resource reuse mode.

In some embodiments, the ID is associated to one of the indexes for the resource reuse mode based on:

$$\left\lfloor \frac{l}{M} \right\rfloor$$

wherein $\lfloor X \rfloor$ is a function of acquiring the maximum integer smaller than or equal to X,
  and l is the ID and M refers to the maximum number of supported the resource reuse mode.

In some embodiments, the at least one report comprises the ID associated to the reference signal with the best received quality.

In some embodiments, the resource reuse mode is indicated by a Quasi Co-Location QCL, relationship.

In some embodiments, reference signals within the same resource group are configured with the same number of antenna ports.

In some embodiments, reference signals within the same resource group have the same time domain behavior,
  wherein the time domain behavior is one of a periodic behavior, a semi-persistent behavior or an aperiodic behavior.

In some embodiments, the time domain behavior is the periodic behavior or the semi-persistent behavior and the reference signals in the same resource group have the same periodicity.

In some embodiments, the time domain behavior is the aperiodic behavior and transmissions of the reference signals in the same resource group are triggered by a signaling from the wireless network node.

In some embodiments, the configuration allocates a time gap between every two reference signals which are within the same resource group and associated to different resource reuse modes.

In some embodiments, the configuration allocates a time gap between every two reference signals which are within different resource groups associated to different resource reuse modes.

In some embodiments, the time gap is determined by a capability of the wireless terminal.

In some embodiments, the wireless terminal does not have scheduling within the time gap.

In some embodiments, at least one measurement for the at least one report is performed in at least one of:
- an order of reference signals within one resource group, or;
- an order of identifications of resource groups corresponding to the at least one reference signal or
- an order of identifications of resource settings corresponding to the resource groups.

In some embodiments, the wireless communication method further comprises receiving, from the wireless network node, a signaling of triggering the at least one report.

In some embodiments, the at least one report on uplink resources scheduled by the wireless network node and the uplink resources are a time offset later than measurements of the at least one report.

In some embodiments, the time offset is determined by at least one of:
- the number of resources configured for the measurement,
- resource switching gap,
- duplex mode, or
- timing advanced.

In some embodiments, the at least one report is triggered when at least one criterion is satisfied.

In some embodiments, the at least one criterion comprises at least one of:
- an elevation angle between the wireless terminal and the wireless network node exceeds an angle threshold, or
- a distance between the wireless terminal and a reference point exceeds a range threshold.

In some embodiments, the at least one report is transmitted in in one of preconfigured periodic uplink resources or a buffer status report, BSR.

In some embodiments, the wireless communication method further comprises transmitting, to the wireless network node, a scheduling request for transmitting a measurement report.

The present disclosure relates to a wireless communication method for use in a wireless network node, the wireless communication method comprising:
- transmitting, to a wireless terminal, a configuration indicating resources of at least one reference signal, and
- receiving, from the wireless terminal, at least one report based on the configuration.

Various embodiments may implement the following features:

In some embodiments, the configuration indicates a resource reuse mode per reference signal, per resource group of reference signals or per resource groups of reference signals.

In some embodiments, the resource reuse mode indicates at least one of:
- a frequency region,
- a polarization mode,
- a combination of a frequency region and a polarization mode, or
- a spatial resource.

In some embodiments, the configuration indicates an identification, ID, associated to the resource reuse mode.

In some embodiments, the ID is associated to one of the indexes for the resource reuse mode based on one of:
- the ID,
- the maximum number of the indexes for the resource reuse mode and the ID, or
- the maximum number of the supported resource reuse modes and the ID.

In some embodiments, the ID is associated to one of the indexes for the resource reuse mode based on:

$$\mathrm{mod}(l,N+1)+1$$

wherein mod(X,Y) is a function of modulo operation of dividing X by Y,
and l is the ID and N refers to the maximum number of indexes for resource reuse mode.

In some embodiments, the ID is associated to one of the indexes for the resource reuse mode based on:

$$\mathrm{mod}(l,M)+1$$

wherein mod(X,Y) is a function of modulo operation of dividing X by Y,
and l is the ID and M refers to the maximum number of supported resource reuse modes.

In some embodiments, the ID is associated to one of the indexes for the resource reuse mode based on:

$$\left\lfloor \frac{l}{N+1} \right\rfloor$$

wherein $\lfloor X \rfloor$ is a function of acquiring the maximum integer smaller than or equal to X,
and l is the ID and N refers to the maximum number of indexes for the resource reuse mode.

In some embodiments, the ID is associated to one of the indexes for the resource reuse mode based on:

$$\left\lfloor \frac{l}{M} \right\rfloor$$

wherein $\lfloor X \rfloor$ is a function of acquiring the maximum integer smaller than or equal to X,
and l is the ID and M refers to the maximum number of supported the resource reuse mode.

In some embodiments, the at least one report comprises the ID associated to the reference signal with best received quality.

In some embodiments, the resource reuse mode is indicated by Quasi Co-Location QCL, relationship In some embodiments, reference signals within the same resource group are configured with the same number of antenna ports.

In some embodiments, reference signals within the same resource group have the same time domain behavior,
wherein the time domain behavior is one of a periodic behavior, a semi-persistent behavior or an aperiodic behavior.

In some embodiments, the time domain behavior is the periodic behavior or the semi-persistent behavior and the reference signals in the same resource group have the same periodicity.

In some embodiments, the time domain behavior is the aperiodic behavior and transmissions of the reference signals in the same resource group are triggered by a signaling from the wireless network node.

In some embodiments, the configuration allocates a time gap between every two reference signals which are within the same resource group and associated to different resource reuse modes.

In some embodiments, the configuration allocates a time gap between every two reference signals which are within different resource groups associated to different resource reuse modes.

In some embodiments, the time gap is determined by a capability of the wireless terminal.

In some embodiments, the wireless terminal does not have scheduling within the time gap.

In some embodiments, at least one measurement for the at least one report is performed in at least one of:
- an order of reference signals within one resource group, or;
- an order of identifications of resource groups corresponding to the at least one reference signal or
- an order of identifications of resource settings corresponding to the resource groups.

In some embodiments, the wireless communication method further comprises transmitting, to the wireless terminal, a signaling of triggering the at least one report.

In some embodiments, the at least one report on uplink resources scheduled by the wireless network node and the uplink resources are a time offset later than measurements of the at least one report.

In some embodiments, the time offset is determined by at least one of:
- the number of resources configured for the measurement,
- resource switching gap,
- duplex mode, or
- timing advanced.

In some embodiments, the at least one report is triggered when at least one criterion is satisfied.

In some embodiments, the at least one criterion comprises at least one of:
- an elevation angle between the wireless terminal and the wireless network node exceeds an angle threshold, or
- a distance between the wireless terminal and a reference point exceeds a range threshold.

In some embodiments, the at least one report is transmitted in in one of preconfigured periodic uplink resources or a buffer status report, BSR.

In some embodiments, the wireless communication method further comprises receiving, from the wireless terminal, a scheduling request for transmitting the at least one report.

The present disclosure relates to a wireless communication method for use in a wireless terminal. The wireless communication method comprises:
  receiving, from a wireless network node, a signaling of switching serving resources,
  wherein the signaling comprises at least one of:
  target resources of switching the serving resources,
  a resource reuse mode,
  a ID, or
  a reference point for grouping wireless terminals, or
  an elevation threshold for grouping wireless terminals.

Various embodiments may implement the following features:

In some embodiments, the signaling comprises at least one component corresponding to at least one wireless terminal group.

In some embodiments, the wireless communication method further comprises:
  decoding the signaling of switching the serving resources, to determine target resources of the wireless terminal, and
  monitoring the target resources of the wireless terminal.

In some embodiments, the wireless terminal fails to decode the signaling of switching the serving resources and the wireless communication method further comprises:
  transmitting, to the wireless network node, a feedback indicating the failure of decoding the signaling of switching the serving resources.

The present disclosure relates to a wireless communication method for use in a wireless network node. The wireless communication method comprises:
  transmitting, to a wireless terminal, a signaling of switching serving resources,
  wherein the signaling comprises at least one of:
  target resources of switching the serving resources,
  a resource reuse mode,
  a ID, or
  a reference point for grouping wireless terminals, or
  an elevation threshold for grouping wireless terminals.

Various embodiments may implement the following features:

In some embodiments, the signaling comprises at least one component corresponding to at least one wireless terminal group.

In some embodiments, the wireless communication method further comprises receiving, from the wireless terminal, a feedback indicating a failure of decoding the signaling of switching the serving resources.

The present disclosure relates to a wireless terminal, comprising:
  a communication unit, configured to:
  receive, from a wireless network node, a configuration indicating resources of at least one reference signal, and
  transmit, to the wireless network node, at least one report based on the configuration transmit, to a wireless network node, a signal based on the at least one synchronization value.

Various embodiments may implement the following feature:

In some embodiments, the wireless terminal further comprises a processor configured to perform a wireless communication method of any of the foregoing described methods.

The present disclosure relates to a wireless network node, comprising:
  a communication unit, configured to:
  transmit, to a wireless terminal, a configuration indicating resources of at least one reference signal, and
  receive, from the wireless terminal, at least one report based on the configuration.

Various embodiments may implement the following feature:

In some embodiments, the wireless network node further comprises a processor configured to perform a wireless communication method of any of the foregoing described methods.

The present disclosure relates to a wireless terminal, comprising:
  a communication unit, configured to:
  receiving, from a wireless network node, a signaling of switching serving resources
  wherein the signaling comprises at least one of:
  target resources of switching the serving resources,
  a resource reuse mode,
  a ID, or
  a reference point for grouping wireless terminals, or
  an elevation threshold for grouping wireless terminals.

Various embodiments may implement the following feature:

In some embodiments, the wireless terminal further comprises a processor configured to perform a wireless communication method of any of the foregoing described methods.

The present disclosure relates to a wireless network node, comprising:
a communication unit, configured to:
transmitting, to a wireless terminal, a signaling of switching serving resources,
wherein the signaling comprises at least one of:
target resources of switching the serving resources,
a resource reuse mode,
a ID, or
a reference point for grouping wireless terminals, or
an elevation threshold for grouping wireless terminals.

Various embodiments may implement the following feature:

In some embodiments, the wireless network node further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method of any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

DETAILED DESCRIPTION

Figure 1A:
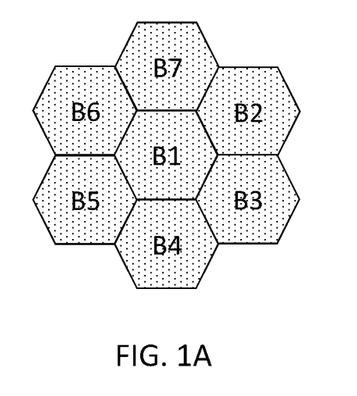
FIGS. 1A to 1D shows examples of resource reuse modes of beams.
Figure 1B:
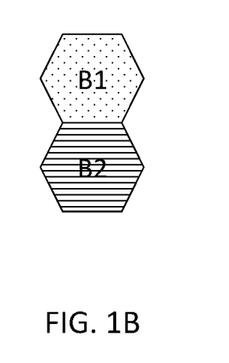
Figure 1C:
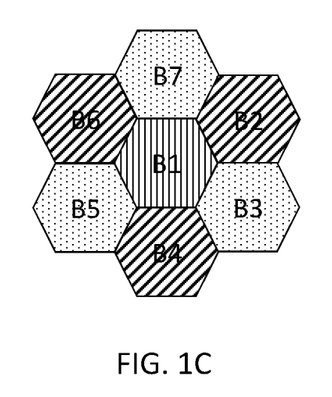
Figure 1D:
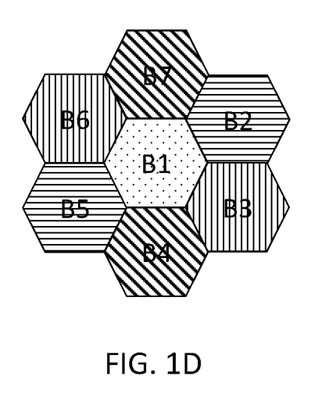

The above issues may become more serious in a non-terrestrial network with services from satellite (e.g. High-Altitude Pseudo-Satellites (HAPS)) or in air-to-ground (ATG) cases. More specifically, an instantaneous service area for one cell may be covered by plenty of beams, which sweep across a target region with a movement of the satellite along the orbit of the satellite. To alleviate occurring interference, resource reuse among beams may be adopted. For example, the beams are mapped to different frequency regions and/or different polarization modes. FIGS. 1A to 1D show examples of resource reuse modes among beams B1 to B7 covering adjacent service areas. In FIG. 1A, the beams B1 to B2 are configured to the same frequency region and the same polarization mode. In FIG. 1B, the beams B1 and B2 are configured to the same frequency region and different polarization modes. In FIG. 1C, the beams B1 to B7 are configured to different frequency regions and the same polarization mode. In FIG. 1D, the beams B1 to B7 are configured to different frequency regions and different polarization modes. When the resource reuse among beams is adopted, the resource configuration and/or triggering condition should be carefully considered.

In addition, a footprint diameter of a single satellite beam could be hundreds of kilometers or even larger. In such large coverage, the number of user equipments (UEs) would be huge. If the network informs the UEs one by one about serving frequency changes, signaling overhead would be high because of the huge number of UEs.

Figure 2:
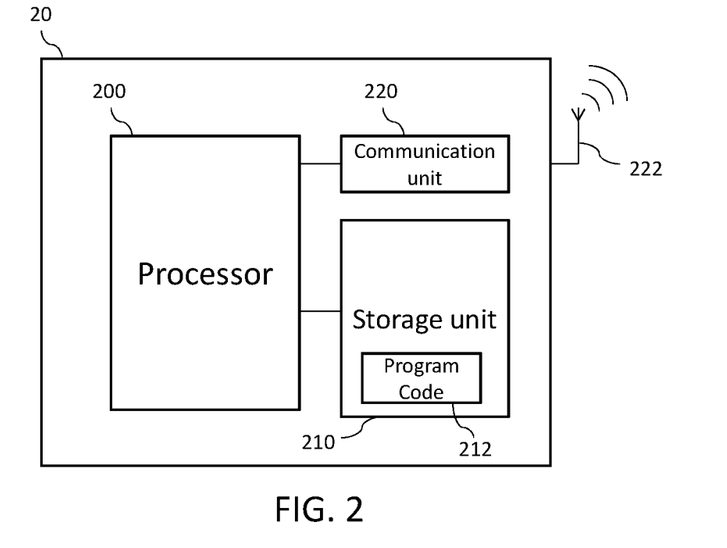
FIG. 2 shows an example of a schematic diagram of a wireless terminal according to an embodiment of the present disclosure.

FIG. 2 relates to a schematic diagram of a wireless terminal 20 according to an embodiment of the present disclosure. The wireless terminal 20 may be a user equipment (UE), a mobile phone, a laptop, a tablet computer, an electronic book or a portable computer system and is not limited herein. The wireless terminal 20 may include a processor 200 such as a microprocessor or Application Specific Integrated Circuit (ASIC), a storage unit 210 and a communication unit 220. The storage unit 210 may be any data storage device that stores a program code 212, which is accessed and executed by the processor 200. Embodiments of the storage unit 212 include but are not limited to a subscriber identity module (SIM), read-only memory (ROM), flash memory, random-access memory (RAM), hard-disk, and optical data storage device. The communication unit 220 may a transceiver and is used to transmit and receive signals (e.g. messages or packets) according to processing results of the processor 200. In an embodiment, the communication unit 220 transmits and receives the signals via at least one antenna 222 shown in FIG. 2.

In an embodiment, the storage unit 210 and the program code 212 may be omitted and the processor 200 may include a storage unit with stored program code.

The processor 200 may implement any one of the steps in exemplified embodiments on the wireless terminal 20, e.g., by executing the program code 212.

The communication unit 220 may be a transceiver. The communication unit 220 may as an alternative or in addition be combining a transmitting unit and a receiving unit configured to transmit and to receive, respectively, signals to and from a wireless network node (e.g. a base station).

Figure 3:
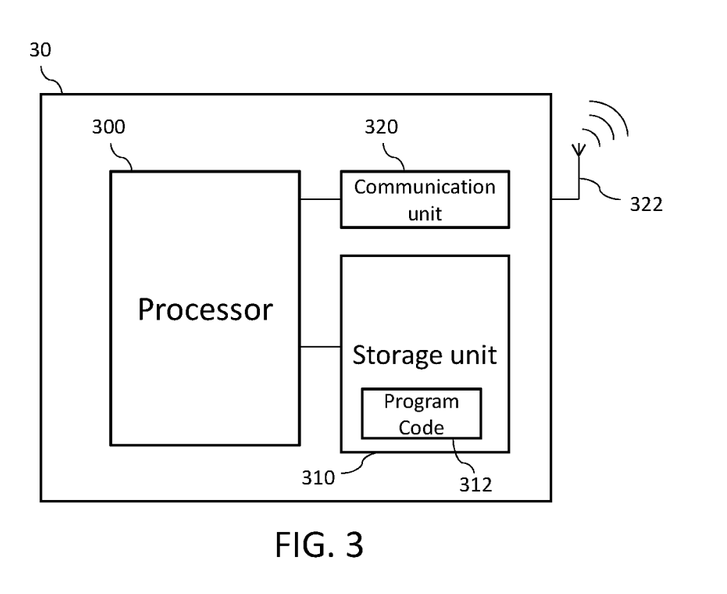
FIG. 3 shows an example of a schematic diagram of a wireless network node according to an embodiment of the present disclosure.

FIG. 3 relates to a schematic diagram of a wireless network node 30 according to an embodiment of the present disclosure. The wireless network node 30 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 30 may comprise (perform) at least one network function such as an access and mobility management function (AMF), a session management function (SMF), a user place function (UPF), a policy control function (PCF), an application function (AF), etc. The wireless network node 30 may include a processor 300 such as a microprocessor or ASIC, a storage unit 310 and a communication unit 320. The storage unit 310 may be any data storage device that stores a program code 312, which is accessed and executed by the processor 300. Examples of the storage unit 312 include but are not limited to a SIM, ROM, flash memory, RAM, hard-disk, and optical data storage device. The communication unit 320 may be a transceiver and is used to transmit and receive signals (e.g. messages or packets) according to processing results of the processor 300. In an example, the communication unit 320 transmits and receives the signals via at least one antenna 322 shown in FIG. 3.

In an embodiment, the storage unit 310 and the program code 312 may be omitted. The processor 300 may include a storage unit with stored program code.

The processor 300 may implement any steps described in exemplified embodiments on the wireless network node 30, e.g., via executing the program code 312.

The communication unit 320 may be a transceiver. The communication unit 320 may as an alternative or in addition be combining a transmitting unit and a receiving unit configured to transmit and to receive, respectively, signals to and from a wireless terminal (e.g. a user equipment).

In this disclosure, a frequency region may be a frequency region, a bandwidth part (BWP), a carrier, a component carrier (CC), an anchor carrier or a non-anchor carrier.

In this disclosure, a reference signal may be equated to a reference resource.

In this disclosure, a reference signal (RS) may be a channel state information (CSI) RS, a synchronization signal block (SSB), synchronization signal (SS) or a cell specific RS (CRS).

In this disclosure, a group of reference signals can refer to the resource set (e.g. resource group) and multiple resource groups can be further organized into different resource settings. That is, the resource setting may comprise one or more resource groups.

In an embodiment, the BS configures resources of RS(s) to the UE, to acknowledge channel conditions. For example, the BS may transmit a configuration to the UE, wherein the configuration indicates resources of RS(s).

In an embodiment, the configuration indicates resource reuse mode(s) of the RS(s). The resource reuse mode refers to resources where the associated RS (or channel) is transmitted/received. For example, the resource reuse mode indicates (e.g. refers to or is determined as) at least one of:
  a frequency region,
  a polarization mode,
  a combination of a frequency region and a polarization mode, or
  a spatial resource.

Note that the frequency region and/or the polarization mode can be described (e.g. indicated) by either the index of resource or indicator only. For example, the frequency region may be indicated by a BWP Id or a carrier frequency ID. In an embodiment, the polarization mode may be indicated by the indicator (e.g., 0 refers to polarization mode 1, 1 refers to polarization mode 2, and so on).

In an embodiment, the polarization mode may refer to the following exemplified polarization: right-hand circular polarization, left-hand circular polarization, liner polarization, or cross-polarization.

In an embodiment, the spatial resource may refer to resource for different antenna ports, resource for different antennas, resource with different Quasi Co-Location (QCL) reference signal for QCL type (e.g., Type-D) in the associated QCL indication.

After receiving the configuration, the UE transmits report(s) to the BS based on the configuration. For example, the UE may perform measurements based on the configuration and transmits the report(s) with measurement results to the BS based on the configuration.

The resources configuration of the RSs (i.e. measurements), condition(s) of triggering the measurement and behaviors of reporting are discussed in the following.

Embodiment 1: Resource Configuration for Measurement

In this embodiment, configurations of resource are exemplified for elaborating:
  a) How to organize RSs for measurements
    e.g. how to map the RSs to frequency region(s) and/or polarization mode(s)
  b) Specific requirements for RS configuration/transmission/reception Case-1: At least one RS is configured within a resource group (e.g. a resource set) to the UE, wherein each RS has its own resources. In an embodiment, the number of RSs configured within single resource group is a positive integer N.

In an embodiment, the BS configures the resources (e.g. a resource reuse mode) per RS. In other words, the BS explicitly indicates the resources for each RS via the configuration.

In an embodiment, each RS is transmitted in a single frequency region. In this embodiment, the frequency region corresponding to each RS may be configured to the UE. For example, an index of the frequency region may be configured per RS.

In an embodiment, each RS may have its own polarization mode. Under such a condition, the polarization mode corresponding to each RS may be configured to the UE.

In an embodiment, each RS may have its own frequency region and polarization mode. In this embodiment, the index of the frequency region and the polarization mode corresponding to each RS are configured to the UE.

In an embodiment, the BS may configure an identification (ID) per RS, wherein each ID is associated to a specific resource reused mode.

In an embodiment, the ID is a logic ID.

In an embodiment, the ID is derived from other sources. For example, the ID may be derived in a similar way as a cell-ID, which is obtained based on detection of secondary synchronization signal (SSS). In another example, the ID may be derived in similar way as a synchronization signal block (SSB) index, which is derived via decoding corresponding information within the SSB.

In an embodiment, the ID may be determined by at least one of:
a) Configured parameter,
b) Frequency region (e.g. index or ID of frequency region)
c) Polarization mode (e.g. index or ID of polarization mode)

In an embodiment, the configured parameter indicates which kind of resource-reuse mode is supported. In an example, the configured parameter may indicate whether polarization-reuse is enabled. In another example, the configured parameter may indicate whether frequency-reuse is enabled. In still another example, the configured parameter may indicate enabled resource-reuse mode among beams (e.g. those shown in FIGS. 1A to 1D).

In an embodiment, the ID is associated to one resource reuse mode (e.g. a polarization mode and/or a frequency region).

Figure 4:
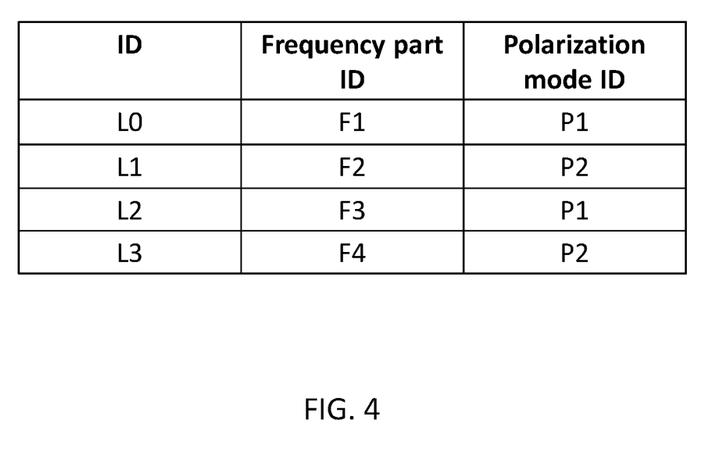
FIG. 4 shows a schematic diagram of the ID according to an embodiment of the present application.

FIG. 4 shows a schematic diagram of the ID according to an embodiment of the present application. In FIG. 4, each of the IDs L0, L1, L2 and L3 is associated with its own frequency region and polarization mode. The L0 is associated with frequency region ID F1 and polarization mode ID P1, the L1 is associated with frequency region ID F2 and polarization mode ID P2, and so on.

In an embodiment, the resource reuse mode for the ID is determined based on the maximum number of supported resource reuse modes (e.g. the maximum number of indexes for the resource reuse modes) and the ID.

In an embodiment, the resource reuse mode for each ID may be determined by:

$$\mathrm{mod}(l, N+1)+1$$

wherein l is the ID, mod(X,Y) is a function of modulo operation of dividing X by Y and N refers to the maximum number of indexes for the resource reuse mode.

Figure 5:
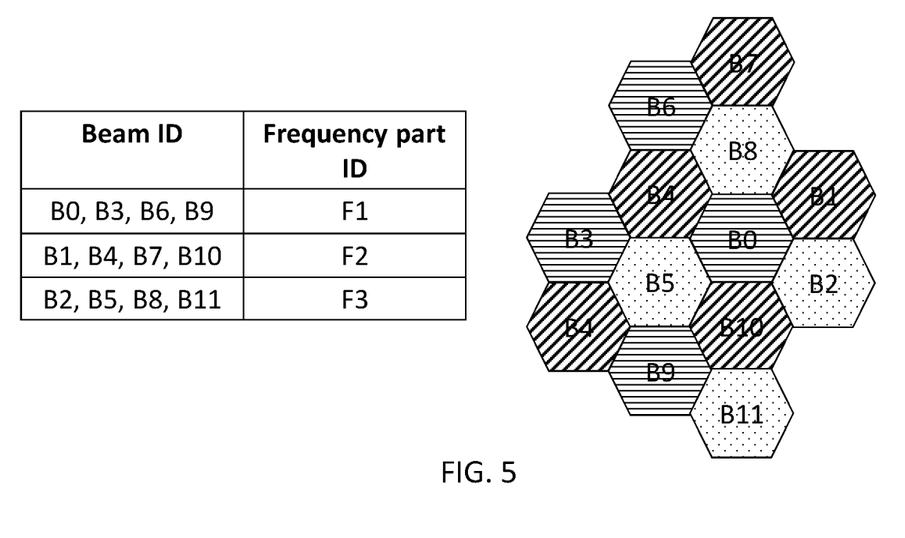
FIG. 5 shows a schematic diagram of the ID and corresponding beam IDs according to an embodiment of the present application.

FIG. 5 shows a schematic diagram of the ID and corresponding beam IDs according to an embodiment of the present application. In FIG. 5, the ID implicitly refers to the beam IDs B0 to B11. In addition, the resource reuse mode indicates the frequency region ID and 3 frequency region IDs F1, F2 and F3 are supported. In this embodiment, the resource reuse mode for each ID may be determined by mod(l,N+1)+1. Note that the index of the resource reuse ID starts from 0 in this embodiment. Thus, N=2 in this embodiment.

For example, B0 is corresponding to F1 because mod(0, 3)+1=1. Similarly, B3, B6 and B9 are corresponding to F1; B1, B4, B7 and B10 are corresponding to F2; and B2, B5, B8 and B11 are corresponding to F3.

In an embodiment, the resource reuse mode for each ID may be determined by:

$$\mathrm{mod}(l, M)+1$$

wherein mod(X,Y) is a function of modulo operation of dividing X by Y, l is the ID and M refers to the maximum number of supported resource reuse modes.

In an embodiment, the resource reuse mode for each ID may be determined by:

$$\left\lfloor \frac{l}{N+1} \right\rfloor$$

wherein $\lfloor X \rfloor$ is a function (e.g. bottom function) of acquiring the maximum integer smaller than or equal to X, l is the ID and N refers to the maximum number of indexes for the resource reuse mode.

In an embodiment, the resource reuse mode for each ID may be determined by:

$$\left\lfloor \frac{l}{M} \right\rfloor$$

wherein $\lfloor X \rfloor$ is a function of acquiring the maximum integer smaller than or equal to X, l is the ID and M refers to the maximum number of supported the resource reuse mode.

In an embodiment, the resource reuse mode indicates only one of frequency region and polarization mode. In this embodiment, the ID is determined by considering only one factor.

In an embodiment, the resource reuse mode configured per RS is indicated by a QCL relationship. In this embodiment, the resource reuse mode of each RS is implicitly indicated by the configured QCL relationship. In this embodiment, the RS for measurement is assumed to share same properties, e.g., frequency region, polarization mode as the associated reference signal for QCL indication.

In an embodiment, a reference signal REF-A is configured with a QCL relationship consisting of reference signal REF-X as a reference for a QCL-type D and/or Type-D. That is, the reference signals REF-A and REF-X share the same resource reuse mode.

In an embodiment, the definition of the QCL types is defined as:
'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In an embodiment, the RSs configured within the same resource set (e.g. resource group) may have at least one of the following limitations:
a) Same ports number is assumed for RSs;
b) Same time-domain behavior is assumed for RSs (e.g. periodic, semi-persistent or aperiodic);
c) When the RSs are periodic or semi-persistent RSs, the RSs have the same periodicity;
d) When the RSs are aperiodic RSs, transmissions of the RSs are triggered by single signaling;
e) RSs mapping to the same resource group may be allocated into adjacent symbols (or slots) and a gap (e.g. a time gap and/or a frequency gap) is allocated between RSs with different resource reuse modes.

In an embodiment, the time gap may be determined with consideration of the UE capability and specified with the time unit as symbol(s) or slot(s). In case the RSs are within different resource reuse modes, there is a requirement on timing duration for RF tuning or "synchronization". If the RSs across different resources are transmitted in contiguous symbols without the time gap, inaccurate measurement results may be acquired.

In an embodiment, the time gap is specified as a minimum value.

In an embodiment of the UE supporting simultaneously reception of RSs over different resource reuse modes, the time gap may not be needed (e.g. the time gap is set to 0).

In an embodiment, the UE does not have scheduling during the measurement with involving the switching across resources (e.g. during the time gap). That is, the UE is not expected to receive any scheduled channel/RS within this frequency region.

Figure 6:
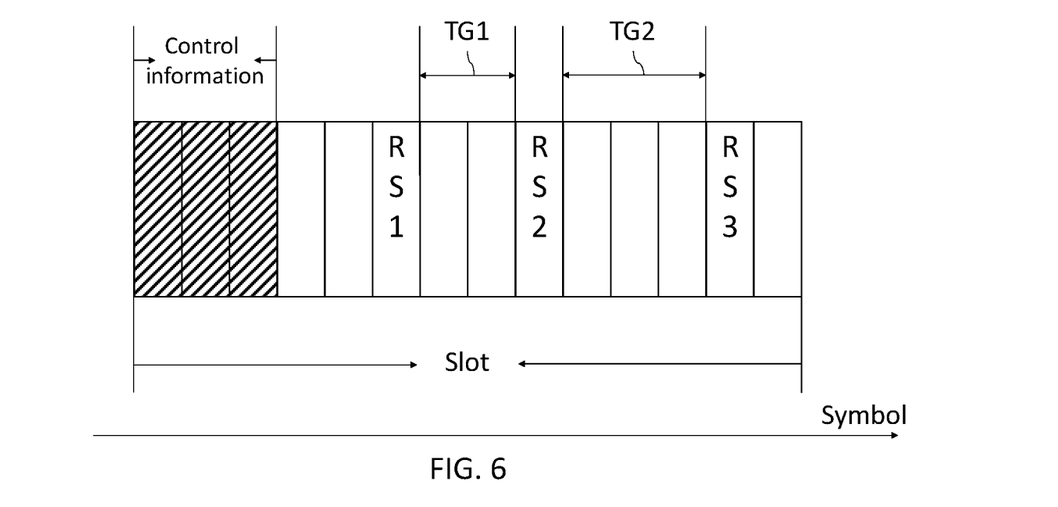
FIG. 6 shows a schematic diagram of resource allocation for RSs according to an embodiment of the present disclosure.

FIG. 6 shows a schematic diagram of resource allocation for RSs according to an embodiment of the present disclosure. In FIG. 6, three RSs, RS1, RS2 and RS3 are transmitted in adjacent symbols, wherein RS1 is corresponding to a polarization mode P0 and a frequency region F1, RS2 is corresponding to a polarization mode P1 and the frequency region F1 and RS3 is corresponding to the polarization mode P0 and a frequency region F0. Because RS1 and RS2 have different resources (i.e. polarization mode P0 and P1), a time gap TG1 is kept between RS1 and RS2. Similarly, a time gap TG2 is kept between RS2 and RS3. Note that TG1 is smaller than TG2 since RS1 and RS2 are different at only the polarization mode and RS2 and RS3 are different at both the polarization mode and the frequency region.

In an embodiment, the time gap may be set to 0 for certain resource switching between RSs transmitted in adjacent symbols.

Case 2—In this case, up to K resource sets (e.g. resource groups) are configured to UE within single or multiple resource settings, wherein K is a positive integer. In an embodiment, each of resource sets has its own resources (e.g. resource reuse mode) for measurements. For example, the resource reuse mode may be configured per resource set (e.g. per resource group).

In an embodiment, the configuration transmitted from the BS explicitly indicates the resource reuse mode per resource set.

In an embodiment, each RS set is transmitted in its own frequency region. Under such a condition, the index of a corresponding frequency region is configured per RS set.

In an embodiment, each RS set is transmitted with its own polarization mode. In this embodiment, the corresponding polarization mode is configured per RS set.

In an embodiment, each RS set is transmitted with its own polarization mode and frequency region. In this embodiment, the resource reuse mode may be defined as including parameters for both the polarization mode and the frequency region and the resource reuse mode is configured per RS set. As an alternative or in addition, corresponding indexes of frequency region and polarization mode are configured per RS set.

In an embodiment, the BS may configure an ID per RS set, wherein each ID is associated to a specific resource reused mode. The details of ID can be referred to FIGS. 4 and 5 and corresponding descriptions and are not described herein for brevity.

In an embodiment, the RS configuration may have at least one of the following limitations:
 a) Same ports number is assumed for all of RSs;
 b) Same time-domain behavior is assumed for all of RSs (e.g. periodic, semi-persistent or aperiodic);
 c) When the RSs are periodic or semi-persistent RSs, all of RSs have the same periodicity;
 d) When the RSs are aperiodic RSs, transmissions of the RSs are triggered by single signaling;
 e) RSs within the same resource set may be allocated into adjacent symbols (or slots) and a gap (e.g. a time gap and/or a frequency gap) is allocated between RSs within different resource sets (e.g. the resource sets have different resource reuse modes).

In an embodiment, the time gap may be determined with consideration of UE capability and specified with time unit as symbol or slots. In case of RSs within different resource reuse modes, the time gap may be inserted for timing durations used for RF tuning or "synchronization". If the RSs across different resources are transmitted in contiguous symbols without the time gap, inaccurate measurement results may be acquired.

In an embodiment, the time gap is specified as a minimum value.

In an embodiment, the time gap may be 0.

In an embodiment of the UE supporting simultaneously reception of RSs over different resource reuse modes, the time gap may not be needed (e.g. the time gap is set to 0).

In an embodiment, the UE does not have scheduling during the measurement with involving the switching cross resources (e.g. during the time gap). That is, the UE is not expected to receive any scheduled channel/RS within this frequency region.

Case-3: In this case, up to K resource sets are configured to UE within multiple resource settings. In this embodiment, the resource reuse mode may be configured per resource setting (i.e. per resource sets).

In an embodiment, within each resource setting, the same frequency region is shared by the RSs within resource sets included in this resource setting.

In an embodiment, within each resource setting, the same polarization mode is shared by RSs within resource sets included in this resource setting.

Embodiment 2: Condition(s) for Triggering Measurement and Report

Based on the configuration received from the BS, the UE may perform measurements and transmit at least one report with measurement results to the BS.
Case-0:
 In an embodiment, the measurement/report is triggered by the BS.
Case-1:
 In an embodiment, the measurement/report is triggered by the UE when at least one of following criteria is satisfied:
 a) An elevation angle between the UE and the BS exceeds an angle threshold,
 b) A distance between the UE and a reference point (e.g., reference point for serving resource/beam) exceeds a range threshold or is not the minimum value (e.g., comparing to the distance between UE and the reference point for other sources/beams).
 c) A timer duration configured by the wireless network expires, or
 d) An RSRP/RSRQ/SINR (e.g., measured value corresponds to serving resource/beam) exceeds a range threshold or is not the largest (e.g., comparing to the measured value for other sources/beams).

In an embodiment, the serving resource/beams refers to the resource where the data (e.g., PDSCH), configuration and scheduling information is transmitted.

In an embodiment, the measurement/report is triggered by the UE when the criteria for distance and RSRP/RSRQ/SINR is satisfied.

In an embodiment, the measurement/report is triggered by the UE when the criteria for elevation angle and RSRP/RSRQ/SINR is satisfied.

In an embodiment, the criteria of triggering the measurement/report may be configured by the BS.

In an embodiment, the criteria, e.g., defined as trigger condition of the measurement/report, may be configured to be aligned with the report configuration for each UE.

Case-2:

In an embodiment of the reference signals for measurement are configured via multiple resource sets (e.g. as proposed in Case-2 within embodiment-1), the UE conducts the measurement following an order of resource set ID. Within multiple resource settings, the measurement follows an order of resource setting ID first, then the order of the resource set ID.

As an example, it can highlight that such group level indication occurs once the same resource reuse mode is shared among resources within each group.

Embodiment 3: Resource for Carrying the Report

Case-0:

In an embodiment, the report may comprises at least one of Reference Signal Received Power (RSRP), layer 1 signal-to-interference-plus-noise-ratio (L1-SINR), Reference Signal Received Quality (RSRQ), deviation of RSRP, deviation of L1-SINR deviation of RSRQ, resource index, resource set index, or ID.

In an embodiment, the ID may refer to the ID of corresponding RS.

In an embodiment, the ID may refer to the ID of the RS with the best received quality (e.g. the highest L1-SINR, the best RSRQ and/or the greatest RSRP).

In an embodiment, the ID(s) represents frequency reuse mode(s), which is associated to the corresponding RS(s).

Case-1:

In this case, the measurement/report is triggered by the BS and the report can be carried by either physical uplink control channel (PUCCH) or physical uplink shared channel (PUSCH) according to the scheduling from the BS.

In an embodiment, transmission instants for the scheduling resource carrying the report are Z time unit after corresponding measurement. Because the uplink (UL) resources including polarization mode for report may be different from the resources allocated for the measurements (e.g., the last one RS during one measurement). Thus, after the measurement finishes, the RF module of the UE should have enough time for being tuned to the UL resource for report transmission.

In an embodiment, the number Z may be determined with consideration on at least one of:
a) The number of resources for measurements;
b) Resource switching gap (e.g. the abovementioned time gap);
c) Duplex mode;
d) Timing advanced.

In an embodiment, the number of resources for measurements indicates that how many RSs will be measured and corresponding configuration, e.g., bandwidth.

In an embodiment, the resource switching gap may refer to the gap for switching among resources for measurements (more resources and switches, more time is required before reporting).

In an embodiment, the resource switching gap may refer to the gap between the resources for measurement and report: if the resource for measurement is different as the resource for report, switching after the measurement is needed.

In an embodiment, the Duplex mode refers to frequency division duplex FDD and/or time division duplex (TDD). In an embodiment, the Duplex mode may also refer to full-duplex mode, half-duplex mode and/or the following two half-duplex mode:

Type A half-duplex FDD operation: a guard period is created by the UE by:
not receiving the last part of a downlink subframe immediately preceding an uplink subframe from the same UE.

Type B half-duplex FDD operation: guard periods, each of the guard periods refers to a half-duplex guard subframe, are created by the UE by:
not receiving a downlink subframe immediately preceding an uplink subframe from the same UE, and
not receiving a downlink subframe immediately following an uplink subframe from the same UE.

In an embodiment, the timing advanced (TA) refers to the TA adjustment for UL transmission. That is, an offset between receiving of scheduling and the UL transmission of report may be larger than value of the TA. In addition, measurement within the TA adjustment region for the UL transmission may not be performed.

Case-2:

In case-2, the measurement/report is triggered by UE once the pre-defined rule(s) is satisfied (e.g. case-2 of embodiment 2). In this case, the measurement report may be carried by a pre-configured resource. For example, the pre-configured resource may be configured-grant PUSCH via radio resource control (RRC), which is periodic with certain periodicity.

It should be noticed that, the measurement results are only carried on the configured resource which satisfy the timing restriction as highlighted in Case-1.

Case-3:

In case-3, the measurement/report is triggered by the UE once the pre-defined rule(s) is satisfied. In an embodiment, there is not available resource for carrying the corresponding measurement results. Under such a condition, the UE may send a scheduling request and/or buffer status report to the BS.

In an embodiment, before reporting measured results (after sending the SR/BSR), the UE does not perform any measurement.

Embodiment 4: Action of the BS after Receiving Report

Case-1: The BS sends a signaling to UE(s) to indicate switching for serving resources.

In an embodiment, the signaling is conducted in the UE group level. For example, J (a positive integer) components are included within the signaling and each component includes at least one of:
a) Target resource ID for switching the serving resources;
b) Resource reuse mode for switching the serving resources;
c) ID for switching the serving resources
b) Reference point for grouping; or
c) Elevation threshold for grouping.

Specifically, when the grouping of UE is conducted by the BS and corresponding grouping information is configured to UE, only the target resource ID for switching the serving resources is sufficient.

In an embodiment, the signaling including the J components may be an RRC signaling, media access control control element (MAC CE) or DCI.

In an embodiment, the serving resource may refer to the frequency resource, time domain resource, etc., which carry the corresponding data/control/RS transmitted from the BS to the UE.

In an embodiment, the BS sends the DCI to UE(s) to indicate the serving resource. In this embodiment, target resource ID (e.g., frequency resource ID such as BWP ID or CC ID), resource reuse mode (e.g., only the polarization mode ID) is included within the DCI.

In an embodiment, the resource reuse mode may not be transmitted for indicating switching for serving resources, e.g., when the same resource reuse mode is applied for both serving and target resource and/or when the BS only schedules the resource with same properties for certain UE based on the report UE capability.

Note that definitions of the resource reuse mode in Embodiment 4 are the same as those shown in Embodiment 1 and are not described herein for brevity.

In an embodiment, the UE selects the corresponding target resource ID corresponding to the grouping criteria (i.e. the reference point for grouping and/or the elevation threshold for grouping).

In an embodiment, the UE decodes the signaling of switching the serving resources and starts to monitor physical downlink control channel (PDCCH) and/or RSs in the target resources after K time unit(s).

In an embodiment, the UE fails to decode the signaling of switching the serving resources. In this embodiment, the UE may send a feedback to inform the BS and such feedback can be a scheduling request or a physical random access channel (PRACH).

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, the wireless communication method comprising:
   receiving, from a wireless network node, a configuration indicating resources of at least one reference signal; and
   transmitting, to the wireless network node, at least one report based on the configuration,
   wherein the at least one report comprises measurement results of at least one measurement performed based on the resources of at least one reference signal,
   wherein the configuration indicates a resource reuse mode per reference signal, per group of reference signals, or per groups of reference signals,
   wherein the resource reuse mode indicates the resources where reference signals associated with the resource reuse mode are transmitted,
   wherein the resource reuse mode is indicated by Quasi Co-Location (QCL) relationship,
   wherein the resources indicate at least one of:
      a frequency region,
      a polarization mode, or
      a combination of a frequency region and a polarization mode, and
   wherein the configuration indicates an identification, ID, associated to the resource reuse mode, wherein the ID is associated to one of the indexes for the resource reuse mode based on one of:
      the ID,
      the maximum number of the indexes for the resource reuse mode and the ID, or
      the maximum number of the supported resource reuse modes and the ID.

2. The wireless communication method of claim 1, wherein the resource reuse mode indicates:
   a spatial resource,
   wherein the ID is associated to one of the indexes for the resource reuse mode based on:

$\mathrm{mod}(l, N+1)+1$, wherein mod (X,Y) is a function of modulo operation of dividing X by Y, and l is the ID and N refers to the maximum number of indexes for resource reuse mode, or
   the ID is associated to one of the indexes for the resource reuse mode based on:

$\mathrm{mod}(l, N+1)+1$, wherein mod (X,Y) is a function of modulo operation of dividing X by Y, and l is the ID and M refers to the maximum number of supported resource reuse modes, or
   the ID is associated to one of the indexes for the resource reuse mode based on:

$$\left\lfloor \frac{l}{N+1} \right\rfloor$$

wherein $\lfloor X \rfloor$ is a function of acquiring the maximum integer smaller than or equal to X, and l is the ID and N refers to the maximum number of indexes for the resource reuse mode, or
   the ID is associated to one of the indexes for the resource reuse mode based on:

$$\left\lfloor \frac{l}{M} \right\rfloor$$

wherein $\lfloor X \rfloor$ is a function of acquiring the maximum integer smaller than or equal to X, and l is the ID and M refers to the maximum number of supported the resource reuse mode.

3. The wireless communication method of claim 1, wherein reference signals within a same group have the same time domain behavior,
   wherein the time domain behavior is one of a periodic behavior, a semi-persistent behavior or an aperiodic behavior,
   wherein the time domain behavior is the periodic behavior or the semi-persistent behavior and the reference signals in the same group have the same periodicity, and
   wherein the time domain behavior is the aperiodic behavior and transmissions of the reference signals in the same group are triggered by a signaling from the wireless network node.

4. The wireless communication method of claim 3, wherein the configuration allocates a time gap between every two reference signals which are within a same group and associated to different resource reuse modes, or a time gap between every two reference signals which are within different resource groups associated to different resource reuse modes, and
   wherein the time gap is determined by a capability of the wireless terminal or the wireless terminal does not have scheduling within the time gap.

5. The wireless communication method of claim 1, wherein the at least one measurement for the at least one report is performed in at least one of:
   an order of reference signals within one group;
   an order of identifications of groups corresponding to the at least one reference signal; or an order of identifications of resource settings corresponding to the groups.

6. The wireless communication method of claim 1, further comprising:
receiving, from the wireless network node, a signaling of triggering the at least one report,
wherein the at least one report on uplink resources scheduled by the wireless network node, and the uplink resources are a time offset later than measurements of the at least one report, and
wherein the time offset is determined by at least one of:
the number of resources configured for the measurement,
resource switching gap,
duplex mode, or
timing advanced.

7. The wireless communication method of claim 1, wherein the at least one report is triggered when at least one criterion is satisfied,
wherein the at least one criterion comprises at least one of:
an elevation angle between the wireless terminal and the wireless network node exceeds an angle threshold, or
a distance between the wireless terminal and a reference point exceeds a range threshold, and
wherein the at least one report is transmitted in in one of preconfigured periodic uplink resources or a buffer status report (BSR) or the method further comprises transmitting, to the wireless network node, a scheduling request for transmitting a measurement report.

8. A wireless communication method for use in a wireless network node, the wireless communication method comprising:
transmitting, to a wireless terminal, a configuration indicating resources of at least one reference signal; and
receiving, from the wireless terminal, at least one report based on the configuration,
wherein the at least one report comprises measurement results of at least one measurement performed based on the resources of at least one reference signal,
wherein the configuration indicates a resource reuse mode per reference signal, per group of reference signals, or per groups of reference signals,
wherein the resource reuse mode indicates the resources where reference signals associated with the resource reuse mode are transmitted,
wherein the resource reuse mode is indicated by Quasi Co-Location (QCL) relationship,
wherein the resources indicate at least one of:
a frequency region,
a polarization mode, or
a combination of a frequency region and a polarization mode, and
wherein the configuration indicates an identification, ID, associated to the resource reuse mode, wherein the ID is associated to one of the indexes for the resource reuse mode based on one of:
the ID,
the maximum number of the indexes for the resource reuse mode and the ID, or
the maximum number of the supported resource reuse modes and the ID.

9. The wireless communication method of claim 8, wherein the resource reuse mode indicates:
a spatial resource,
wherein the ID is associated to one of the indexes for the resource reuse mode based on:

$$\mathrm{mod}(l, N+1)+1,$$

wherein mod (X,Y) is a function of modulo operation of dividing X by Y, l is the ID and N refers to the maximum number of indexes for resource reuse mode, or
the ID is associated to one of the indexes for the resource reuse mode based on:

$$\mathrm{mod}(l, N+1)+1,$$

wherein mod (X,Y) is a function of modulo operation of dividing X by Y, l is the ID and M refers to the maximum number of supported resource reuse modes, or
the ID is associated to one of the indexes for the resource reuse mode based on:

$$\left\lfloor \frac{l}{N+1} \right\rfloor$$

wherein $\lfloor X \rfloor$ is a function of acquiring the maximum integer smaller than or equal to X, l is the ID and N refers to the maximum number of indexes for the resource reuse mode, or
the ID is associated to one of the indexes for the resource reuse mode based on:

$$\left\lfloor \frac{l}{M} \right\rfloor$$

wherein $\lfloor X \rfloor$ is a function of acquiring the maximum integer smaller than or equal to X, l is the ID and M refers to the maximum number of supported the resource reuse mode.

10. The wireless communication method of claim 8, wherein reference signals within a same group have the same time domain behavior,
wherein the time domain behavior is one of a periodic behavior, a semi-persistent behavior or an aperiodic behavior,
wherein the time domain behavior is the periodic behavior or the semi-persistent behavior and the reference signals in the same group have the same periodicity, and
wherein the time domain behavior is the aperiodic behavior and transmissions of the reference signals in the same group are triggered by a signaling from the wireless network node.

11. The wireless communication method of claim 8, wherein the configuration allocates a time gap between every two reference signals which are within a same group and associated to different resource reuse modes,
wherein the configuration allocates a time gap between every two reference signals which are within different resource groups associated to different resource reuse modes, and
wherein the time gap is determined by a capability of the wireless terminal, or the wireless terminal does not have scheduling within the time gap.

12. The wireless communication method of claim 8, wherein at least one measurement for the at least one report is performed in at least one of:
an order of reference signals within one resource group;
an order of identifications of resource groups corresponding to the at least one reference signal; or
an order of identifications of resource settings corresponding to the resource groups.

13. The wireless communication method of claim 8, further comprising:
  transmitting, to the wireless terminal, a signaling of triggering the at least one report, wherein the at least one report is received on uplink resources scheduled by the wireless network node, and the uplink resources are a time offset later than measurement of the at least one report, and
  wherein the time offset is determined by at least one of:
  the number of resources configured for the measurements,
  resource switching gap,
  duplex mode, or
  timing advanced.

14. The wireless communication method of claim 8, wherein the at least one report is triggered when at least one criterion is satisfied, wherein the at least one criterion comprises at least one of:
  an elevation angle between the wireless terminal and the wireless network node exceeds an angle threshold; or
  a distance between the wireless terminal and a reference point exceeds a range threshold; and
  wherein the at least one report is received in one of preconfigured periodic uplink resources or a buffer status report, BSR, or the method further comprises receiving, from the wireless terminal, a scheduling request for transmitting the at least one report.

15. A wireless terminal, comprising:
  a communication unit, configured to:
    receive, from a wireless network node, a configuration indicating resources of at least one reference signal; and
    transmit, to the wireless network node, at least one report based on the configuration,
  wherein the at least one report comprises measurement results of at least one measurement performed based on the resources of at least one reference signal,
  wherein the configuration indicates a resource reuse mode per reference signal, per group of reference signals or per groups of reference signals,
  wherein the resource reuse mode indicates the resources where reference signals associated with the resource reuse mode are transmitted,
  wherein the resource reuse mode is indicated by Quasi Co-Location QCL, relationship,
  wherein the resources indicate at least one of:
    a frequency region,
    a polarization mode, or
    a combination of a frequency region and a polarization mode, and
  wherein the configuration indicates an identification, ID, associated to the resource reuse mode, wherein the ID is associated to one of the indexes for the resource reuse mode based on one of:
    the ID,
    the maximum number of the indexes for the resource reuse mode and the ID, or
    the maximum number of the supported resource reuse modes and the ID.

16. A wireless network node, comprising:
  a communication unit, configured to:
    transmit, to a wireless terminal, a configuration indicating resources of at least one reference signal; and
    receive, from the wireless terminal, at least one report based on the configuration,
  wherein the at least one report comprises measurement results of at least one measurement performed based on the resources of at least one reference signal,
  wherein the configuration indicates a resource reuse mode per reference signal, per group of reference signals or per groups of reference signals,
  wherein the resource reuse mode indicates the resources where reference signals associated with the resource reuse mode are transmitted,
  wherein the resource reuse mode is indicated by Quasi Co-Location QCL, relationship,
  wherein the resources indicate at least one of:
    a frequency region,
    a polarization mode, or
    a combination of a frequency region and a polarization mode, and
  wherein the configuration indicates an identification, ID, associated to the resource reuse mode, wherein the ID is associated to one of the indexes for the resource reuse mode based on one of:
    the ID,
    the maximum number of the indexes for the resource reuse mode and the ID, or
    the maximum number of the supported resource reuse modes and the ID.

* * * * *